Patented Nov. 1, 1932

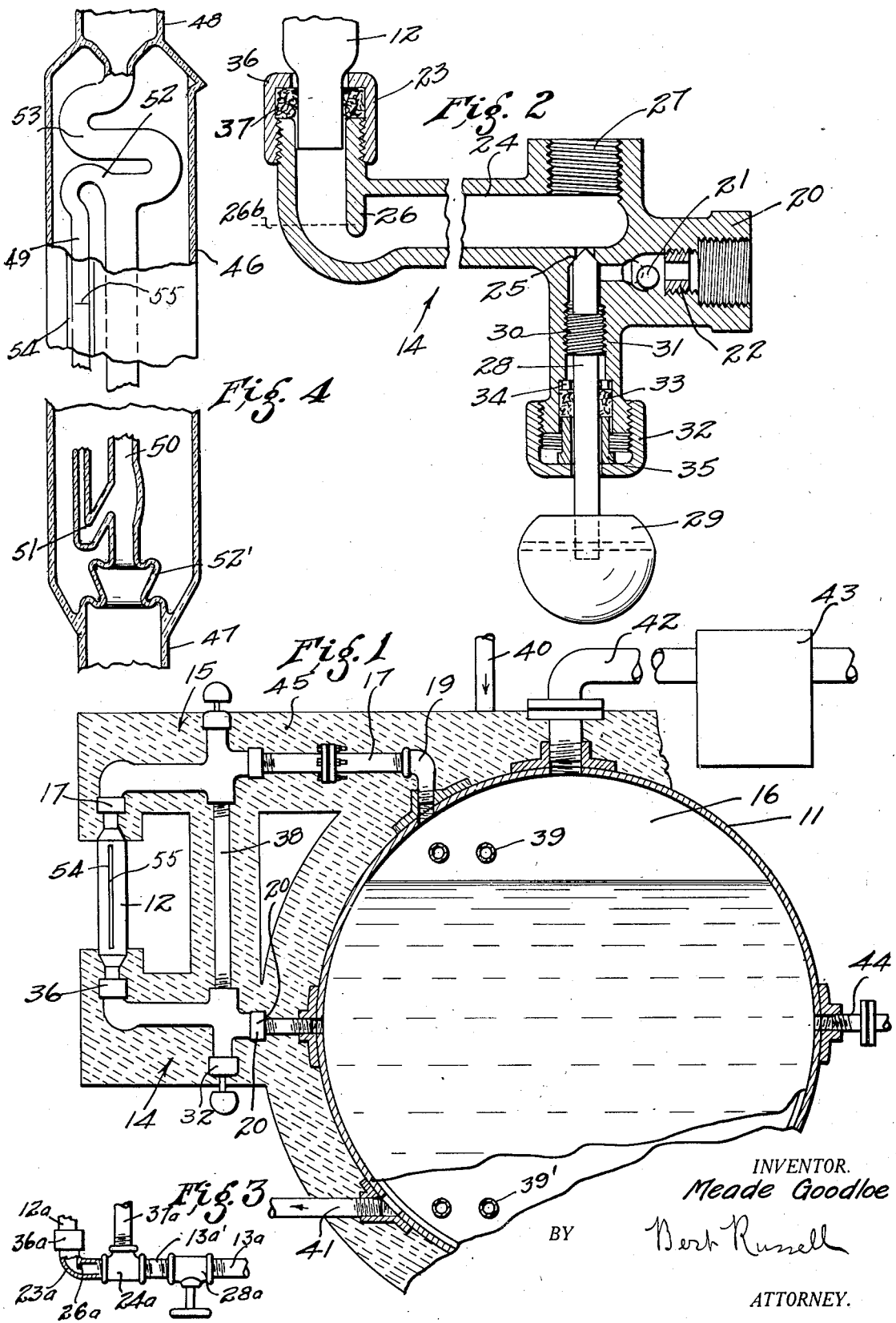

1,886,179

UNITED STATES PATENT OFFICE

MEADE GOODLOE, OF LOS ANGELES, CALIFORNIA

CONNECTION FOR LIQUID LEVEL INDICATORS

Application filed August 24, 1927. Serial No. 215,125.

Although my present invention is referred to merely as a "connection", it should be understood to be an object of this invention to provide, for use with any liquid level indicator adapted to low temperatures, means for reducing or obviating disturbance of a liquid surface or meniscus, in a transparent tube, as a result of an evolution of bubbles; and, although my invention may be chiefly used in connection with refrigerating plants using liquid ammonia, it is believed that the principles of my invention are applicable to refrigerating plants, or the like, using carbon dioxide, liquid air, or the like.

In my recent patent (No. 1,610,003, issued December 7, 1926), I have disclosed a gauge glass enclosed in an evacuated shell in order to obviate the condensation of moisture or frost thereon; and the gauge glass described in my mentioned patent is entirely satisfactory under all ordinary conditions of use,—there being no disadvantage in a gradual or occasional rise of bubbles through a meniscus tube exposed to observation; but I herein provide, for use either at ordinary refrigerating temperatures or at tower temperatures, and either in connection with my patented gauge glass or in connection with liquid level indicators of other types, means for largely or entirely diverting bubbles that may form near the lower end of the meniscus tube or therebelow.

In working at temperatures below about zero° F., notwithstanding any resort to substantially complete enclosure of metallic parts within insulating materials, the conduction of heat through valve fittings and/or other usual connections may, under some conditions of operation, be such as to occasion a local evolution of bubbles in such numbers as to preclude the satisfactory use of even a gauge glass similar to that described in my mentioned patent; and it is accordingly an object of this invention, in one embodiment thereof, to provide the lower or "submerged" connection between a receptacular element for liquid ammonia, or the like, and a level indicator, with means for the trapping and diverting of some or all bubbles that may form in said connection; and, in preferred embodiments of my invention, the said connection may comprise, in addition to the mentioned bubble trap, a suitable bubble outlet thereabove,—the latter preferably communicating with a by-pass extending parallel with the mentioned level indicator. Said connection most naturally includes a coupling or "inlet" element (preferably provided with a usual automatic valve) and it may ordinarily include a seat for a needle valve,—in addition to a gauge-glass receiving element separated from the mentioned trap by a downwardly extending partial partition.

Other objects of the invention, which may or may not include novel features of gauge glass construction, may be best appreciated from the following description of an illustrative embodiment thereof,—taken in connection with the appended claims and accompanying drawing, in which:

Figure 1 is a diagrammatic vertical sectional view, with parts broken away to various planes and with a gauge glass and associated elements shown in elevation.

Fig. 2 is a vertical sectional view, on an enlarged scale and with parts broken away, showing a preferred type of one-piece connection,—in which a trap is interposed between a hand valve seat and a gauge glass receiving element.

Fig. 3 is an elevational view, comparable with Fig. 2 but showing, on a reduced scale, a built-up connection,—in which separate fittings are associated by threaded connections.

Fig. 4 is a vertical section, with some parts broken away and other parts shown in elevation, to illustrate a modified and improved gauge glass,—which may or may not be used in association with lower or "submerged" connections such as are illustrated in Figs. 1—3.

Referring to the details of that specific embodiment of my invention illustrated in Figs. 1 and 2, 11 being a receptacular element for liquid ammonia, or the like, I show at 12 an observation tube in the form of a gauge glass (in which visibility may be maintained by the provision of a vacuum jacket) said gauge glass being connected with said receptacular element by means comprising a special "submerged" connection 14 and an upper or vapor connection 15,—which may be similar in form. The upper connection 15 is shown as connected with a vapor space 16, within the receptacular element 11, by means of a vapor pipe 17 and an elbow 19.

I show the connection 14 as provided at its inner end with coupling element 20 (within which a ball valve 21 normally kept open by gravity but seatable by pressure may be retained by means such as a threaded plug 22) and as carrying, at its outer end, a tube-receiving element 23; and I show a trap element or bubble chamber 24 (provided above a liquid inlet orifice including a valve seat 25) as outwardly terminated (adjacent the end of tube 12, in said tube-receiving element) by a downwardly extending partial partition 26 and as provided with a bubble outlet 27.

Although there need be no novelty in the needle valve organization by which I control the advance of liquid ammonia, or the like, past the seat 25, I show the shaft 28 of said needle valve as provided not only with an externally accessible knob or handle 29 (preferably formed of a heat-insulating material) but with an externally threaded enlargement 30, to engage a suitable interior thread within a guide extension 31; and said guide extension may be provided also with a gland organization comprising a threaded cap 32, adapted to transmit pressure to a suitable packing material 33,—shown as interposed between a washer 34 and a slidable tubular plug 35.

The glass-receiving element 23 is shown as provided with an external thread for a coupling element 36, adapted to compress any suitable packing material 37 into contact with the gauge glass 12; but it should be understood that all of the mentioned details of valve and gland construction are entirely subordinate, in point of novelty and importance, to my interposition, near the lower end of the gauge glass 12, of bubble-diverting means such as the mentioned trap 24,—this being shown as connected with the vapor pipe 17 by a bubble by-pass 38.

By way of suggesting one of the many possible uses of the receptacular element 11, I show the same as interiorly provided with short-run brine pipes diagrammatically indicated at 39, 39′, and presumably connected by means of suitable header spaces with some inlet pipe 40 and some outlet pipe 41,—the mentioned vapor space 18 being shown as connected, by a pipe 42, with a compressor 43, through which an ammonia circuit may be maintained by way of a return pipe 44; and all of the mentioned parts, or their respective equivalents, may advantageously be protected, in a known manner, by a suitable insulating material 45.

By way of illustrating the scope of my invention, I suggest in Fig. 3 the use of a mere T 24a in conjunction with a by-pass 37a and an ordinary valve 28a, to provide a built-up connection between a gauge glass 12a and a nipple 13a,—an additional nipple 13a′ being interposed between the valve 28a and the T 24a and a special elbow 23a, carrying a tube-receiving element 36a being shown as provided with a partial partition 26a; but it will be obvious that the unitary connection illustrated in Fig. 2, involving a minimum quantity of metal and a minimum exposure of metallic surfaces resulting in a minimum transmission of heat to the refrigerant in the lower connection and therefore in a minimum evolution of bubbles, is superior in every respect to any improvised construction such as that shown in Fig. 3. It will readily be seen that heat transmitted into the refrigerant which is in the lower connection between trap 24 and the lower end of the observation tube 12 would cause evolution of bubbles, which would rise through the observation tube. In this connection, it should be understood that some useful effect would be obtainable even if all of the mentioned elements of the described built-up connection were mere "standard" fittings,—the partial partition 26a being omitted; or, I may extend the lower end of the tube to a level (such as that indicated by the dotted line 26b) adapting it to serve as a partial partition.

As stated above, the gauge glass 12 may exactly correspond with the disclosure contained in my mentioned patent; but I nevertheless illustrate in Fig. 4 a type of gauge glass in which interior provision is made for the by-passing of bubbles. In this gauge glass, an outer and evacuated shell 46 may be connected not only with reduced terminal portions 47 and 48 and with an interior meniscus tube 49, but with a bubble-diverting by-pass tube 50,—the meniscus tube 49 being so connected with said by-pass tube (by a trap 51 at the lower end thereof and a bend 52 at or near the upper point of connection between said tubes) as to permit of some relative expansion or contraction, without risk of breakage. As a matter of fact, the main differences in temperature must occur between the described inner tube and the outer shell 46, in the regions of their interconnection; and to obviate the risk of breakage at the respective ends of the by-pass tube 50, or its equivalent, I may employ means such as the convoluted wall shown at 52′ and/or spiral or flat bends such as are shown at 53; and I may advantageously silver the entire interior of the shell 46 except for the provision of a longitudinally extending observation slot 54, through which the meniscus 55, either undisturbed or rendered visible from a distance by the breaking of an orderly succession of bubbles, may be clearly observed.

Whether or not the connection 14 (and/or 15) are formed in one piece, bubbles passing at the valve seat 25, even though formed elsewhere in the longitudinal passage controlled by valves 21 and/or 28 may rise directly through trap 24 into pipe 38; and it should be understood that under all ordinary conditions either the provision of a special connection 14, comprising a bubble trap, or the provision of a by-pass tube 50 within a gauge glass may be entirely sufficient to obviate undue disturbance of the meniscus within any meniscus tube; but I may nevertheless make conjoint use of all of the described features of my invention, under extreme conditions.

It is noted that by-pass tube 38 is spaced a considerable distance from observation tube 12. This spacing permits the use of the heat insulating material 45 in sufficient thickness to prevent condensation or frost forming on the surface thereof, without extending to the observation tube, and thereby interfering with the view thereof. Also, in the event that this insulation were omitted, the spacing would be sufficient to prevent such an accumulation of frost on by-pass tube 38, which would be formed by the action of the refrigerating liquid or cold vapor within this by-pass tube, from extending to the observation tube and similarly interfering with the view thereof.

Although I have herein described a single complete embodiment of my invention, suggesting various alternatives and optional features, it should be understood not only that various subcombinations thereof might be independently employed, but also that numerous alternatives, additional to those herein suggested, might easily be devised, by workers skilled in the arts to which this case relates, without involving the slightest departure from the spirit and scope of my invention, as the same is indicated above and in the following claims. For example,—the tube 50, when provided, may be white or silvered or colored or otherwise rendered opaque, if desired.

I claim as my invention:

1. Liquid level indicating means for use in connection with a liquid of low boiling point and where conditions of temperature and pressure may cause an evolution of bubbles therein, said means comprising: an evacuated outer shell; a meniscus tube extending therethrough; and means for diverting bubbles from near the lower end of said tube, to prevent the same from rising therethrough.

2. Liquid level indicating means for use in connection with a liquid of low boiling point and where conditions of temperature and pressure may cause an evolution of bubbles therein, said means comprising: an avacuated outer shell; a meniscus tube extending therethrough; and means for diverting bubbles, from near the lower end of said tube, to prevent the same from rising therethrough, said shell being evacuated and said diverting means being a by-pass inside said outer shell and extending substantially parallel with said meniscus tube.

3. Liquid level indicating means for use in connection with a liquid of low boiling point and where conditions of temperature and pressure may cause an evolution of bubbles therein, said means comprising: a vacuum jacketed observation tube; connections therefrom to a receptacular element; and means extending between said connections, for by-passing bubbles that may form within the lower of said connections, the lower of said connections being provided with a downwardly extending partial partition adjacent to the lower end of said observation tube, to check the advance of bubbles.

4. Liquid level indicating means comprising: a pair of connections; an outer shell; a meniscus tube extending therethrough; and means for diverting bubbles formed near the lower end of said tube, to prevent the same from rising therethrough, said tube being secured between said connections and said diverting means comprising both a by-pass tube within said shell and a trap within the lower of said connections.

5. In an organization designed for showing the level of low boiling liquids for use with a receptacle for such liquids, where conditions of temperature and pressure may cause an evolution of bubbles therein; an observation tube, upper and lower connections between said receptacle and the tube for the passage of the low boiling liquid and its vapor, means for trapping and by-passing bubbles away from the observation tube, said means comprising a bubble trap in the lower connection closely adjacent the lower end of the observation tube, means in said lower connection forming a bubble outlet for said trap, and a bubble by-pass connecting the bubble outlet and the passageway in the upper connection, said organization being characterized in that the passageway between the bubble trap and the bubble outlet is substantially entirely unobstructed.

6. In an organization designed for showing the level of low boiling liquids for use with a receptacle for such liquids, where conditions of temperature and pressure may cause an evolution of bubbles therein; an observation tube, upper and lower connections between said receptacle and the tube for the passage of the low boiling liquid and its vapor, means for trapping and by-passing bubbles away from the observation tube, said means comprising a bubble trap in the lower connection adjacent the lower end of the observation tube, means in said lower connection forming a bubble outlet for said trap, and a bubble by-pass connecting the bubble outlet and the passageway in the upper connection, said organization being characterized by the fact that the passageways extending from the bubble trap, through the bubble outlet, and through the bubble by-pass into the upper connection are unobstructed.

7. In an organization designed for showing the level of low boiling liquids for use with a receptacle for such liquids, where conditions of temperature and pressure may cause an evolution of bubbles therein; an observation tube, upper and lower connections between said receptacle and the tube for the passage of the low boiling liquid and its vapor, means for trapping and by-passing bubbles away from the observation tube, said means comprising a bubble trap in the lower connection adjacent the lower end of the observation tube, said bubble trap comprising a partial partition in the lower connection extending downwardly from the upper inner wall thereof, means in said lower connection forming a bubble outlet for said trap, and a bubble by-pass connecting the bubble outlet and the upper connection; said organization being characterized by the fact that the passageways extending from the bubble trap, through the bubble outlet, and through the bubble by-pass into the upper connection are unobstructed.

8. In an organization designed for showing the level of low boiling liquids for use with a receptacle for such liquids, where conditions of temperature and pressure may cause an evolution of bubbles therein; an observation tube, upper and lower connections between said receptacle and the tube for the passage of the low boiling liquid and its vapor, means for trapping and by-passing bubbles away from the observation tube, said means comprising a bubble trap in the lower connection adjacent the lower end of the observation tube, means in said lower connection forming a bubble outlet for said trap, and a bubble by-pass connecting the bubble outlet and the passageway in the upper connection, said organization being characterized by the fact that the passageways extending from the bubble trap, through the bubble outlet, and through the bubble by-pass into the upper connection are unobstructed, said observation tube and the bubble by-pass being spaced apart sufficiently so that neither frost formed on the wall of the by-pass nor insulation applied to the by-pass will substantially interfere with the view of the observation tube.

9. An organization for showing the level of low boiling liquids for use with a receptacle for such liquids, where conditions of temperature and pressure may cause an evolution of bubbles, an observation tube, upper and lower connections between the tube and the receptacle, means for trapping bubbles, and means for by-passing bubbles away from the observation tube, said by-passing means communicating with said trapping means and said upper connection, said trapping means being in the lower connection adjacent the lower end of the observation tube, that part of the lower connection adjacent the lower end of the observation tube having such small exterior surface that the heat transmitted to the liquid which is in the lower connection beneath the observation tube is materially restricted.

10. An organization for showing the level of low boiling liquids for use with a receptacle for such liquids, where conditions of temperature and pressure may cause an evolution of bubbles, an observation tube, upper and lower connections between the tube and the receptacle, means for trapping bubbles, means for by-passing bubbles away from the observation tube, said by-passing means communicating with said trapping means and said upper connection, said trapping means being in the lower connection adjacent the lower end of the observation tube, and insulation against heat covering at least that portion of the lower connection which is adjacent the lower end of the observation tube, as well as covering the lower end of the observation tube where it enters the connection.

11. An organization for showing the level of low boiling liquids for use with a receptacle for such liquids, where conditions of temperature and pressure may cause an evolution of bubbles, a vacuum-jacketed observation tube, upper and lower connections between the tube and the receptacle, means for trapping bubbles, means for by-passing bubbles away from the observation tube, said by-pass means communicating with said trapping means and said upper connection, said trapping means being in the lower connection adjacent the lower end of the observation tube, the passageways extending from the bubble trap through the bubble by-passing means and into the upper connection being unobstructed, that part of the lower connection adjacent the lower end of the observation tube having such small exterior surface that the heat transmitted to the liquid which is in the lower connection beneath the observation tube is materially restricted, and insulation against heat covering at least that portion of the lower connection which is adjacent the lower end of the observation tube, as well as the lower end of the observation tube where it enters the connection.

In witness whereof, I have hereunto affixed my signature.

MEADE GOODLOE.